(12) United States Patent
Kirschner et al.

(10) Patent No.: US 7,453,769 B2
(45) Date of Patent: Nov. 18, 2008

(54) CAVITATING BODY SONAR SYSTEM AND PROCESS

(75) Inventors: Ivan N. Kirschner, Portsmouth, RI (US); Donald T. Lerro, Mystic, CT (US); Larry Freeman, Arlington, VA (US); Rudolph Martinez, Cambridge, MA (US); James S. Uhlman, Jr., Middletown, RI (US)

(73) Assignee: General Dynamics Information Technology, Inc., Fairfax, VA (US)

(*) Notice: Subject to any disclaimer, the term of this patent is extended or adjusted under 35 U.S.C. 154(b) by 0 days.

(21) Appl. No.: 11/757,202

(22) Filed: Jun. 1, 2007

(65) Prior Publication Data

US 2008/0002526 A1    Jan. 3, 2008

Related U.S. Application Data

(63) Continuation-in-part of application No. 11/351,265, filed on Feb. 10, 2006, and a continuation-in-part of application No. 10/953,300, filed on Sep. 29, 2004, now Pat. No. 7,106,656.

(60) Provisional application No. 60/809,788, filed on Jun. 1, 2006, provisional application No. 60/651,624, filed on Feb. 11, 2005, provisional application No. 60/506,507, filed on Sep. 29, 2003.

(51) Int. Cl.
    *G01S 15/00* (2006.01)
(52) U.S. Cl. ........................................... 367/99
(58) Field of Classification Search ............. 367/99
    See application file for complete search history.

(56) References Cited

U.S. PATENT DOCUMENTS 4,209,783 A    6/1980   Ohyama et al.

(Continued)

OTHER PUBLICATIONS

Ihor Nesteruk, "The Problems of Drag Reduction in High Speed," The International Summer Scientific School, High Speed Hydrodynamics, Jun. 2002, Cheboksary, Russia.

(Continued)

*Primary Examiner*—Dan Pihulic

(74) *Attorney, Agent, or Firm*—Venable LLP; Ralph P. Albrecht

(57) ABSTRACT

An exemplary embodiment of the present invention may include a cavitating body sonar system and method. The method may include, in an exemplary embodiment: applying a receiving-while-transmitting sonar signal processing to at least one cavitating body, over an entire range of achievable sonar operating frequencies; applying transmit wave-form shaping to a RWT sonar system employed on the cavitating body; applying heterodyne filter frequency rejection to the RWT sonar system employed on the cavitating body; applying detection processing techniques to the RWT sonar system employed on the cavitating body; employing at least one transducer as an acoustical transmitter near a scattering body comprising the cavitating body, wherein the at least one transducer is strategically located with respect to said cavitating body, at least one target, and a receiver, wherein the receiver lies in a shadow zone of the body, but the at least one target does not; and, employing at least one transducer as an acoustical transmitter near a scattering body comprising the cavitating body, wherein the at least one transducer is strategically located with respect to a cavity, at least one target, and a receiver, wherein direct propagation of a transmitted signal along the outside of the cavity to the receiver is inhibited, and reflected propagation from the acoustical transmitter to the target and thence reflected to the receiver is not inhibited.

20 Claims, 8 Drawing Sheets

U.S. PATENT DOCUMENTS

| | | | |
|---|---|---|---|
| 4,721,385 | A | 1/1988 | Jelalian et al. |
| 4,961,174 | A | 10/1990 | Teel et al. |
| 5,150,335 | A | 9/1992 | Hoffman |
| 6,128,249 | A | 10/2000 | Sullivan |
| 2006/0007784 | A1* | 1/2006 | Lerro et al. .................... 367/98 |
| 2007/0077044 | A1* | 4/2007 | Kirschner et al. ........... 392/485 |
| 2008/0002526 | A1* | 1/2008 | Kirschner et al. ............. 367/87 |

OTHER PUBLICATIONS

Ihor Nesteruk, "Sub- and Supersonic Shapes Without Separation and Cavitation," exact date unknown, Kyiv, Ukraine, included as an Appendix to U.S. Appl. No. 60/651,624, filed Feb. 11, 2005.

Ihor Nesteruk, "Experimental Investigations of Concave Cavities," exact date unknown, included as an Appendix to U.S. Appl. No. 60/651,624, filed Feb. 11, 2005.

Irza et al; "A Low Frequency High Resolution Sonar for AUVs," Autonomous Underwater Vehicle Technology, 1992; Proceedings of the 1992 Symposium on Jun. 2-3, 1992, pp. 215-218.

Magnasco, Marcelo O., "The Cochlear Tuning Curve," arXiv: physics/0111204 v1-21 Nov. 2001.

Thoma, R.S. et al., "Identification of the Time-Variant Directional Mobile Radio Channels," 9. Virginia Tech Symposium on Wireless Personal Communic., Blacksburg, VA, USA, May 26, 1999; IEEE Transactions on Instrumentation and Measurement, vol. 49, No. 2, Apr. 2000, pp. 357-364.

Burdic, W.S., Underwater Acoustic Analysis, Prentice Hall, Englewood Cliffs, NJ 1984.

Nielson, R.O., Sonar Signal Processing, Artech House, Norwood, MA 1991.

Skolnik, M.I., Introduction to Radar Systems, McGraw Hill, New York 1962.

Urick, R.J., Principles of Underwater Sound, McGraw Hill, New York 1975.

Widrow, B., Stearns, S., Adaptive Signal Processing, Prentice Hall, Englewood Cliffs, NJ 1985.

International Search Report and Written Opinion issued in PCT/US2007/012922.

* cited by examiner

CAVITATING BODY SONAR SYSTEM AND PROCESS

This application is a nonprovisional claiming the benefit under 35 U.S.C. Section 119(e) of U.S. Provisional Patent Application Ser. No. 60/809,788, filed on 1 Jun. 2006, entitled "Cavitating Body Sonar System and Process," to Kirschner et al., of common assignee to the claimed invention, the contents of which is incorporated herein by reference in its entirety.

This application is a continuation-in-part of U.S. patent application Ser. No. 10/953,300, now U.S. Pat. No. 7,106,656 entitled "Sonar System and Process," to Lerro, et al., filed on 29 Sep. 2004, which itself claims the benefit under 35 U.S.C. Section 119(e) of U.S. Provisional Patent Application Ser. No. 60/506,507, entitled "Receive While Transmit (RWT) Sonar," filed on 29 Sep. 2003, (hereafter "Lerro, et al., (2003)"), of common assignee to the claimed invention, the contents of both of which are incorporated herein by reference in their entirety.

This application is also a continuation-in-part of U.S. patent application Ser. No. 11/351,265, filed on 10 Feb. 2006, entitled "Increased Aperture Homing Cavitator," to Kirschner et al., which itself claims the benefit under 35 U.S.C. Section 119(e) of U.S. Provisional Patent Application Ser. No. 60/651,624, filed on 11 Feb. 2005, entitled "Increased Aperture Homing Cavitator," to Kirschner et al., of common assignee to the claimed invention, the contents of which is incorporated herein by reference in its entirety.

FIELD OF THE INVENTION

The present invention is generally related to homing system performance for cavitating bodies or other high-speed underwater bodies and acoustical sensors such as sonar.

BACKGROUND OF THE INVENTION

Homing supercavitating torpedo concepts currently being considered in ongoing research and development programs employ cavitators, which may have a positive pressure drag coefficient, to produce a cavity that expands outward in a downstream direction from the cavity inception point to some maximum cavity radius, then contracts to the point of cavity closure, usually positioned downstream of the body. A significant drag advantage can be obtained via the near elimination of friction drag.

However, the small wetted area of the cavitator poses problems if that area is to host transducers serving as forming the elements of a sonar system. Specifically, the amount of acoustical power that can be transmitted via the small wetted area is limited: overpowering the system causes cavitation on the nominally wetted transducer faces, causing severe performance degradation. Furthermore, the aperture of the sonar array is limited by the small cavitator diameter, and the number of array elements that can be practically packed within such a small volume is also quite limited, which in turn limits the beam-forming capabilities of the system. Since drag of such a cavitator is directly proportional to its projected area at the locus of cavity detachment, simply increasing the cavitator size is not a practical option, since it would eliminate the drag advantage that is otherwise gained via supercavitation. In order to provide enough elements in this small space to form beams to localize a target with respect to the array, the elements must be relatively small, and therefore must operate at higher acoustical frequencies than those on a conventional torpedo array.

Sound navigation and ranging (SONAR) is a technique that uses sound propagation under water to navigate or to detect objects in or on the water. As is well known in the relevant art, there are two types of sonar: passive and active. Passive sonar seeks to detect an object target by listening for the sound emanating from the object being sought. Active sonar creates a pulse of sound, and then listens for reflections of the pulse from a target object. To determine the distance to the target, elapsed time from emission of a pulse to reception is measured. To determine the directional bearing, several hydrophones are used to measure the relative arrival time to each in a process called beam-forming.

Conventionally, most active sonar systems cannot receive while they are transmitting. This is because conventional active sonar systems use the same device, (called a 'transducer'), to both transmit and receive, and transducers cannot both transmit and receive at the same time.

Conventional art thus fails to show how to effectively discriminate between signals that sonar receives from its own transmitter and echoes from the intended target subject to certain linearity and rejection requirements.

SUMMARY OF THE INVENTION

An exemplary embodiment of the present invention may include a cavitating body sonar system and method. In an exemplary embodiment, the method may include applying receiving-while-transmitting sonar signal processing (hereafter referred to as "RWT" sonar signal processing) to at least one cavitating body, over an entire range of achievable sonar operating frequencies; applying transmit wave-form shaping to a RWT sonar system employed on the cavitating body; applying heterodyne filter frequency rejection to the RWT sonar system employed on the cavitating body; applying detection processing techniques to the RWT sonar system employed on the cavitating body; employing at least one transducer as an acoustical transmitter near a scattering body may include the cavitating body, wherein the at least one transducer is strategically located with respect to the cavitating body, at least one target, and a receiver, wherein the receiver lies in a shadow zone of the body, but the at least one target does not; and, employing at least one transducer as an acoustical transmitter near a scattering body may include the cavitating body, wherein the at least one transducer is strategically located with respect to a cavity, at least one target, and a receiver, wherein direct propagation of a transmitted signal along the outside of the cavity to the receiver is inhibited, and reflected propagation from the acoustical transmitter to the target and thence reflected to the receiver is not inhibited. Note that RECEIVE-WHILE-TRANSMIT™ is a trademark of the Anteon Corporation, of Fairfax, Va. USA.

An exemplary embodiment of the method of the present invention may further include: applying a high-data-rate tracking technique to the RWT sonar system employed on the cavitating body.

An exemplary embodiment of the method of the present invention may further include: employing an output of the RWT sonar system (including the transmit wave-form shaping, heterodyne filter frequency rejection, detection processing, and high-data-rate tracking) to support guidance and control of the cavitating body.

An exemplary embodiment of the method of the present invention may include where the cavitating body may include a supercavitating torpedo.

An exemplary embodiment of the method of the present invention may further include: applying transmit null steering techniques to improve performance of the RWT sonar system for the cavitating body.

An exemplary embodiment of the method of the present invention may include applying the transmit null steering techniques, which may include, in an exemplary embodiment, a phase cancellation technique.

An exemplary embodiment of the method of the present invention may further include: applying receive beam-former spatial rejection to improve performance of the RWT sonar system for the cavitating body.

An exemplary embodiment of the method of the present invention may further include: at least one fin-mounted transducer as the transmitter of the RWT sonar system for the cavitating body.

An exemplary embodiment of the method of the present invention may further include: employing at least one cavitator-mounted receive array, including a receive array incorporated in a laminar flow cavitator, in combination with the at least one transmitter, the receive array serving as the receiver of the RWT sonar system for the cavitating body.

An exemplary embodiment of the method of the present invention may further include: applying the RWT sonar system to the cavitating body wherein the at least one transmitter is coupled to the cavitating body at a location other than a tip of a fin.

An exemplary embodiment of the method of the present invention may further include: applying the RWT sonar system to the cavitating body wherein the at least one transmitter is detached from the cavitating body.

An exemplary embodiment of the method of the present invention may further include: applying the RWT sonar system to the cavitating body wherein the at least one transmitter is located on a platform from which the cavitating body is launched.

An exemplary embodiment of the present invention may include a method for detecting sonar signals, which may include: generating a waveform; performing waveform shaping; transmitting the waveform acoustically from a cavitating body; directly receiving the acoustic waveform and reflected echoes of the acoustic waveform at the cavitating body; performing temporal frequency rejection on the received acoustic waveforms; optionally performing the step of spatially filtering the received acoustic waveform; and optionally tracking the detected reflected echoes.

An exemplary embodiment of the present invention may include where the transmitting the waveform is accomplished by emitting a single frequency continuous wave.

An exemplary embodiment of the present invention may include where the shaping is accomplished by performing amplitude tapering. An exemplary embodiment of the present invention may include where the waveform shaping is performed to avoid signal discontinuities.

An exemplary embodiment of the present invention may include where the waveform shaping is performed to avoid signal discontinuities at its beginning and end.

An exemplary embodiment of the present invention may capitalize on improved sonar system performance that can be derived from simultaneously transmitting a sonar signal while receiving the echo of that signal from targets or other objects of interest. This technique may allow continuous processing of the received signal, as opposed to alternative conventional systems that transmit sonar signals over short time periods, a technique typically referred to as "pinging." Because the signal is continuously received and processed, the total amount of acoustical energy available to detect, classify, localize, track, and/or target underwater objects, can be significant, even if the amount of transmitted power is relatively small or the target strength is weak.

Further features and advantages of the invention, as well as the structure and operation of various embodiments of the invention, are described in detail below with reference to the accompanying drawings.

BRIEF DESCRIPTION OF THE DRAWINGS

The foregoing and other features and advantages of the invention will be apparent from the following, more particular description of exemplary embodiments of the invention, as illustrated in the accompanying drawings wherein like reference numbers generally indicate identical, functionally similar, and/or structurally similar elements.

DETAILED DESCRIPTION OF VARIOUS EXEMPLARY EMBODIMENTS

An exemplary embodiment of the present invention involves applying to cavitating body(ies) an active "receiving-while-transmitting" (RWT) sonar system. The RWT sonar system may be capable of continuously receiving while transmitting, and may provide a method of operating the sonar system subject to linearity and rejection requirements according to an exemplary embodiment of the invention. RECEIVE-WHILE-TRANSMIT™ is a trademark of the Anteon Corporation, of Fairfax, Va. USA and refers to a particular class of such RWT devices available from Anteon Corporation.

The system's receiver discriminates (in bearing, range, and/or frequency) between the signal it receives from its own transmitter and the reflected signals, or echoes, it receives from the intended target(s) even while the system is transmitting. This is accomplished by incorporating into the system a receiver having a large dynamic range (the ratio of minimum to maximum input levels over which the receiver's output level remains linearly proportional to the level of the receiver's input), as explained in more detail below.

Figure 1:
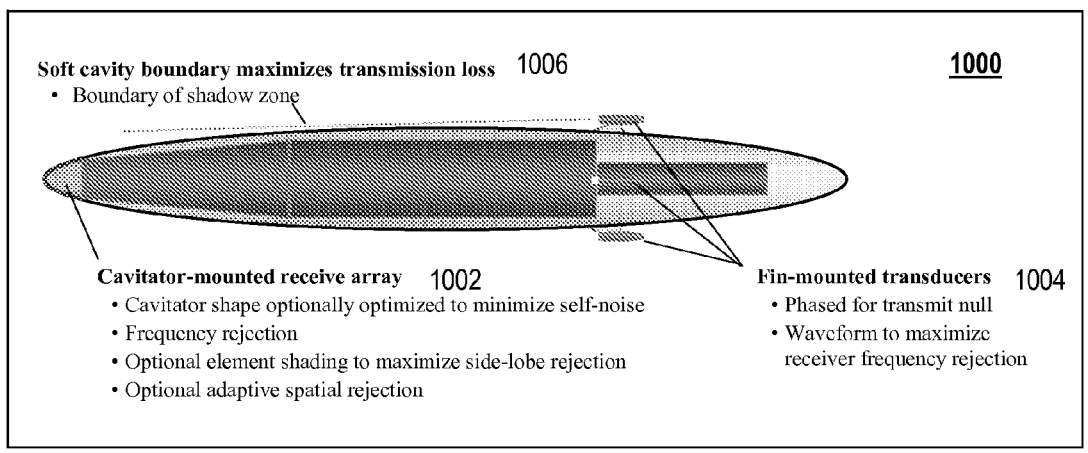
FIG. 1 depicts an exemplary view of an exemplary cavitating torpedo with an exemplary arrangement of transducers and a receiver for application of RWT sonar according to an exemplary embodiment of the present invention.

FIG. 1 depicts an exemplary view of an exemplary cavitating torpedo 1000 with an exemplary arrangement of one or more transducers and one or more receivers for application of RWT sonar to cavitating bodies, according to an exemplary embodiment of the present invention. FIG. 1 is discussed in greater detail below. FIG. 1 depicts a diagram 1000, illustrating an exemplary embodiment of the present invention, including an exemplary, and non-limiting, arrangement of one or more transducer(s) 1004 and receiver(s) 1002 with respect to a notional cavitating torpedo 1000 and its cavity 1006.

Increased Aperture Homing Cavitator (IAHC)

An exemplary embodiment of the invention may be used with an Increased Aperture Homing Cavitator as described in U.S. Nonprovisional patent application Ser. No. 11/351,265, filed on 10 Feb. 2006, entitled "Increased Aperture Homing Cavitator," to Kirschner et al., which itself claims the benefit under 35 U.S.C. Section 119(e) of U.S. Provisional Patent Application Ser. No. 60/651,624, also entitled, "Increased Aperture Homing Cavitator," filed Feb. 11, 2006, both of which are of common assignee to the present invention, and the contents of both of which are incorporated herein by reference in their entireties. An exemplary cavitating body according to an exemplary embodiment of the present invention may include, e.g., but not limited to, an increased aperture homing cavitator (IAHC), a cavitating torpedo, a super cavitating body, a super cavitating torpedo, and/or another cavitating body.

Receive-While-Transmit Sonar Application to Cavitating Bodies

The receiving-while-transmitting (RWT) sonar system concept according to an exemplary embodiment of the present invention, as applied to undersea sonar processes at relatively low frequencies (less than 12 kHz) is described in "Lerro, et al., (2003)". For those applications to undersea sonar processes at relatively low frequencies (i.e., e.g., but not limited to, less than 12 kHz), the RECEIVE-WHILE-TRANSMIT™ sonar concept is a proprietary technology available from Anteon Corporation of Fairfax, Va. USA, (the name RECEIVE-WHILE-TRANSMIT™ is also a trademark of Anteon Corporation), with a patent application pending under 35 U.S.C. Section 119 (e), U.S. Provisional Patent Application Ser. No. 60/506,507, entitled "Receive While Transmit (RWT) Sonar," filed 29 Sep. 2003, and its related U.S. Nonprovisional patent application Ser. No. 10/953,300, now U.S. Pat. No. 7,106,656 entitled "Sonar System and Process," filed 29 Sep. 2004. Both of these patent applications, referred to herein collectively as Lerro, et al., (2003), are of common assignee to the present invention, and the contents of which are incorporated herein by reference in their entireties. In an exemplary embodiment of the present invention, in order for the receive-while-transmit concept to work, two requirements must be met: (1) a linearity requirement that the total received signal (including the component received directly from the transmitter) be maintained within the linear regime of operation of the receiver; and, (2) a direct signal rejection requirement that the receiver and processor together are able to discriminate between the signal received directly from the transmitter and that received from the target and its environs. It can be shown that, among other constraints, these two requirements impose on operation of a receiving-while-transmitting (RWT) sonar system the necessity of separating the source from the receiver in space. The invention claimed in Lerro, et al., (2003) presents additional techniques for meeting these two requirements, including, e.g., but not limited to, application of modem electronic components to meet the linearity requirement, and modulation of the transmitted signal frequency, optimization of the receiver-signal processor side-lobe characteristics, application of adaptive beam-forming techniques, selection of transmitter configurations that provide a spatial null in the direction of the receiver, and/or other methods to enhance direct signal rejection.

Using this proprietary approach, the performance of RWT sonar systems can be significantly better than that of conventional pinging systems. Improvements which may be obtained, according to an exemplary embodiment of the present invention, may include: signal processing gains greater than 6 dB under reverberation-limited conditions, and greater than 20 dB under noise-limited conditions, as compared to current pulsed sonar methods for typical Navy applications at relatively low frequencies (less than 12 kHz) are predicted, and have been at least partly demonstrated in field tests. Additionally, during analysis of at-sea RWT test data as applied to undersea sonar processes for such typical low-frequency Navy applications, target track latency has been identified as significantly improved using RWT concepts: an order-of-magnitude improvement was observed in comparison with conventional high-power pulsed search sonar. For example, the RWT system demonstrated latency on the order of 50-60 s for target identification as compared to 500-600 s for a pulsed sonar system.

An exemplary embodiment of the present invention, may include a combination of several techniques in a specific physical environment that can allow the RWT concept to be applied at higher frequencies specifically to serve as the basis of a sonar system for cavitating bodies such as supercavitating torpedoes. These elements may be summarized, according to an exemplary embodiment of the present invention, as follows (including, but not limited to):

1. High-frequency acoustical energy transmitted past a body is diffracted by that body such that shadow zones exist, within which the acoustical energy received directly from the transmitter is significantly reduced. (See, for example: Sammelmann, G. S., D. H. Trivett, and R. H. Hackman (1988) "High-Frequency Scattering from Rigid Prolate Spheroids, J. Acoust. Soc. Am., 83, 1, pp 46-54, (hereinafter "Sammelmann, et al., 1988"); Blake, W. K., and G. A. Wilson (1977) "Short-Wavelength Diffracted Surface Pressures on a Rigid Prolate Spheroid,", J. Acoust. Soc. Am., 61, 6, pp 1419-1426 (hereinafter "Blake and Wilson, 1977"), the contents of both of which are incorporated herein by reference in their entireties). Such zones are of significant extent only if the wavelength of the transmitted signal is very small in comparison with the body dimensions. Under these conditions, therefore, a receiver strategically located with respect to one or more high-frequency transmitters, a target, and a diffracting object can receive significant acoustical energy as an echo from the target while remaining shielded from that propagating directly from the transmitter.

2. A surface that is maintained at or near constant pressure—such as the boundary of a cavity—tends to inhibit the propagation of high-frequency acoustical energy along itself. (See, for example, Wenzel, A. R., (1974) "Propagation of Waves along an Impedance Boundary," J. Acoust. Soc. Am., 55, 5, pp 956-963. (hereinafter "Wenzel, 1974") the contents of which is incorporated herein by reference in its entirety). Thus, if a significant part of the surface of the diffracting object is maintained at constant or nearly constant pressure, as the surface of a cavity is, then propagation of acoustical energy along the direct path from the transmitter to a receiver located elsewhere on the surface may be further reduced from the field that would be scattered from a rigid body of the same shape, while propagation along the path from the transmitter to a target in the field is not subject to transmission loss by this same mechanism.

3. If more than one transmitter is employed, it is possible to specify the phase of the signal transmitted from each in such a way that the acoustical energy received along the direct path from the transmitter is nearly canceled, while the echo from the target is not. (In addition, such controlled phase relationships can be employed to deduce target range and range rate information).

4. If the sonar is used as the basis of a homing system to guide the general motion of a vehicle such as, e.g., but not limited to, a torpedo with respect to a fixed or moving target, that motion may be perturbed in such a way as to minimize the directly received signal and to maximize the echo from the target while accomplishing some overall objective, such as striking the target.

The invention may be understood with the help of the diagrams included herewith. FIG. 1 depicts an exemplary embodiment of a cavitating body according to the present invention, illustrating in diagram 1000, an exemplary and non-limiting, conceived exemplary arrangement of one or more transducer(s) 1004 and receiver(s) 1002 with respect to a notional cavitating torpedo 1000 and its cavity 1006. In this exemplary embodiment, a transmitted acoustical signal originates from one or more transducer(s) 1004, here shown mounted on the tips of control fins, but, which transducers(s) may be coupled or attached in other exemplary embodiments by other means as will be apparent to those skilled in the relevant art, such as, e.g., but not limited to, on one or more struts. In the exemplary embodiment shown in FIG. 1, a cavitator-mounted acoustical array 1002 may serve as the receiver of a torpedo homing system, but in other exemplary embodiments the receive array may be otherwise located, such as, e.g., but not limited to, mounted on one or more struts. In each such embodiment, the transmit and receive transducer(s) may be located such that each active transducer element is in contact with the liquid phase of the ambient fluid under normal operation. As presented in FIG. 1, the torpedo may move through the water (in FIG. 1, from right to left). The torpedo may be fully or partially enveloped in a cavity composed in an exemplary embodiment of, e.g., but not limited to, gas supplied by an on-board gas generator, but in other embodiments the cavity may be composed of, e.g., but not limited to, primarily water vapor caused by natural cavitation.

Figure 2:
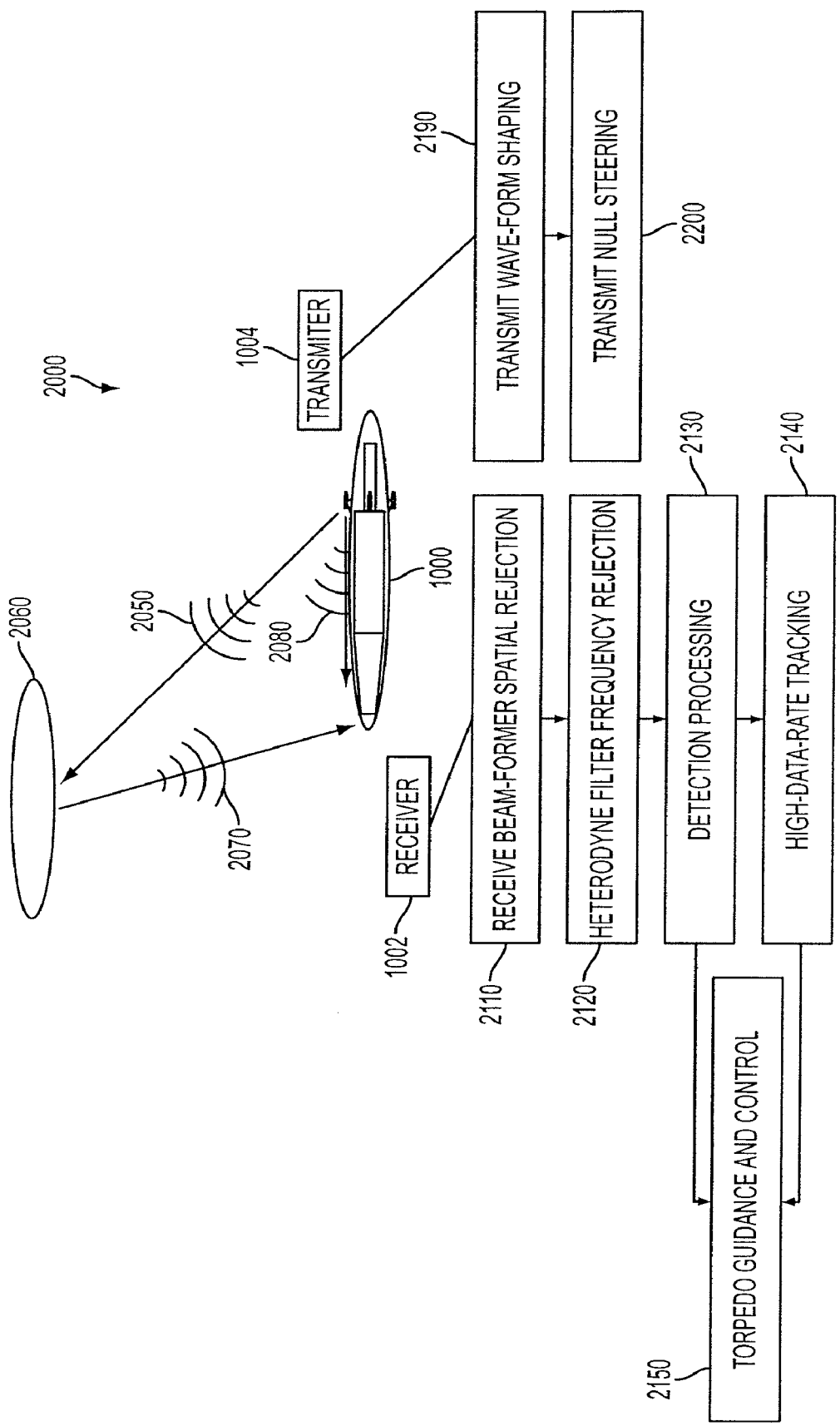
FIG. 2 depicts an exemplary block diagram of a signal processing system for application of a RWT sonar system to a cavitating body such as, e.g., a torpedo, according to an exemplary embodiment of the present invention.

FIG. 2 presents a block diagram 2000 of an exemplary signal processing system for application of the RWT sonar concept to the cavitating torpedo shown in FIG. 1. The transmitted acoustical signal originating at the transducers 1004 shown fin-mounted in the exemplary embodiment illustrated in FIGS. 1 and 2 as one exemplary embodiment propagates through the liquid phase of the fluid system surrounding the torpedo 1000. Part of the acoustical energy 2050 propagates in the direction of a target, such as a submarine or other submerged object, which reflects part of that acoustical energy 2070 back toward the torpedo 1000, whereupon it is received as an acoustical signal by a receive array 1002, shown in the form of a cavitator-mounted receiver in the exemplary embodiment in FIGS. 1 and 2. This path along which energy propagates from the transmitter or transmitters 1004 to the target 2060 and back to the receiver 1002 is known as the reflecting path 2050, 2070. Part of the transmitted acoustical signal 2080 also may propagate along the direct path 2080 from the transmitter 1004 directly to the receiver 1002 along and near the outside of the cavity boundary. The wave-form of the transmitted acoustical signal is selected or shaped in such a manner as to enhance the performance of the sonar system according to a scheme involving frequency modulation of the transmitted signal. In an exemplary embodiment with more than one transmitter, the phase of each transmitter may be selected relative to the others such that the combined acoustical signal propagating along the direct path 2080 from the transmitters to the receive array tends to be minimized over the extent of the receive array due to destructive interference, while the combined acoustical signal propagating along the reflecting path 2050, 2070 may be maximized due to constructive interference. The process by which the acoustical energy received via the direct path 2080 may be minimized is referred to as transmit null steering 2200. The acoustical signal received by the receive array 1002 is converted into an electrical signal by the transducer elements composing the receive array and processed in order to provide useful information, the function of which, in an exemplary embodiment, is guidance and control of the torpedo in order to traverse a trajectory of approach to a target 2060, such as a submarine or other submerged object. In the exemplary embodiment, this signal processing may include spatial rejection 2110 of the acoustical signal received along the direct path via a receive array beam-former, which may coherently sum the signals received by each element of the receive array 1002 in such a way as to localize the target 2060 and to minimize the effect of the acoustical energy received along the direct path 2080 from the transmitter 1004 and any other sources or reflecting bodies that are not objectives. The summed signal may then be processed by a heterodyne filter 2120 to reject or minimize the instantaneous signal received via the direct path 2080 from the transmitter 1004. The filtered signal may then be processed to detect 2130 the presence of one or more targets 2060, and, in an exemplary embodiment, to classify a target 2060 as an objective of approach of the torpedo trajectory. When such a target 2060 is so detected and so classified, the filtered signal may then be further processed to track 2140 the objective target relative to the torpedo. In an exemplary embodiment, the output of the detection and tracking components 2130, 2140 of the signal processor may be input to a torpedo guidance and control system 2150 to direct the trajectory of the torpedo.

Figure 3A:
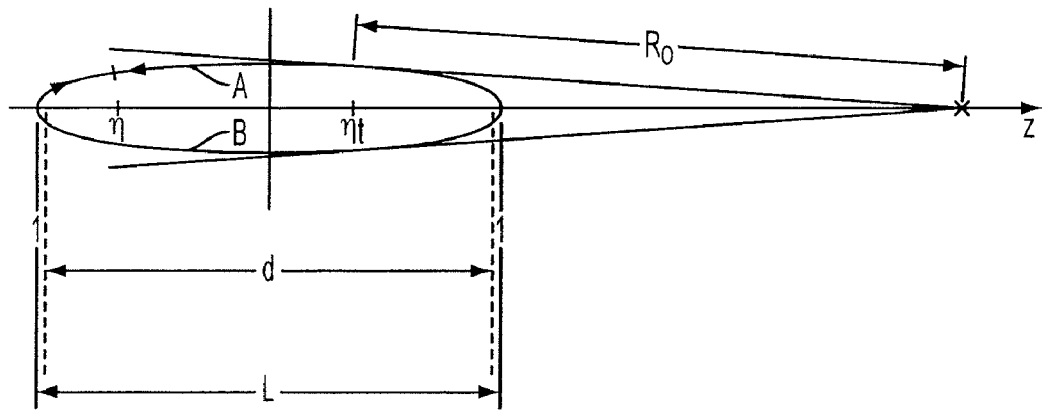
FIG. 3A depicts an exemplary geometry associated with exemplary experimental and computational results according to an exemplary embodiment of the present invention.
Figure 3B:
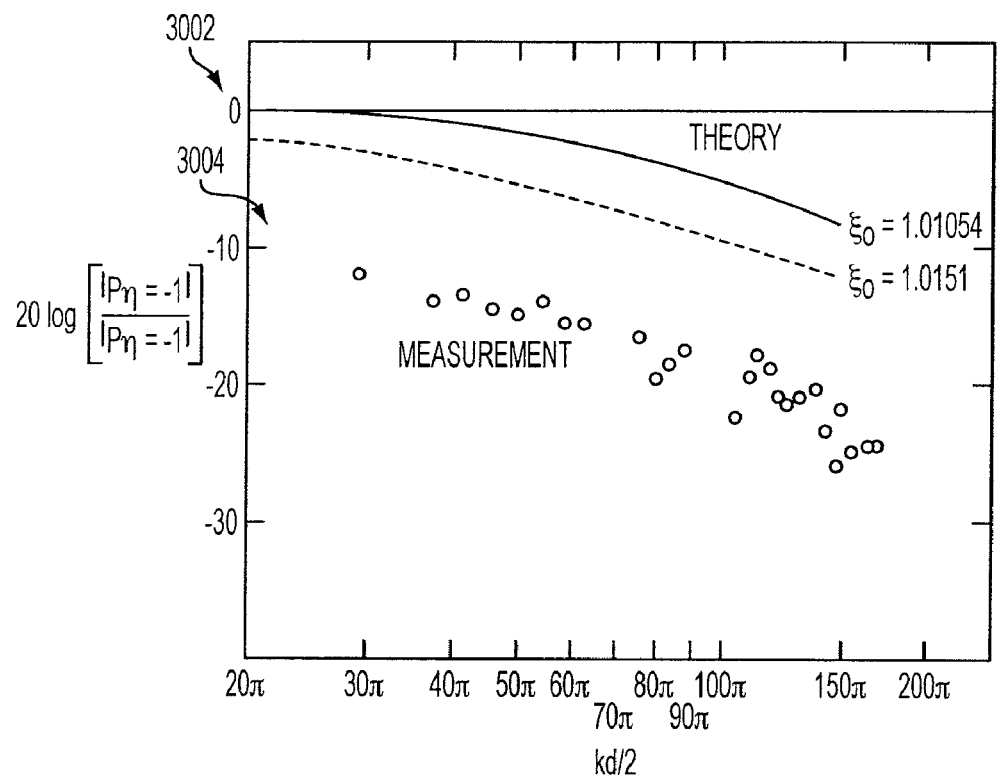
FIG. 3B depicts an exemplary experimental and computational results showing attenuation at a antipode of a slender spheroid of an acoustical signal generated by a source located on the centerline, including a chart plotting attenuation as a function of wavenumber and including theoretical expectations, and actual measurements according to an exemplary embodiment of the present invention.

It must be considered whether or not it is possible to continuously transmit a signal from transducers mounted on the fins or by other means of attachment to the torpedo without violating the linearity requirement of the receive array, that is, without transmitting acoustical energy along the direct path 2080 of such intensity that the signal received by the receive array exceeds its linear operating range. Several facts about acoustical fields near supercavities serve to support the conjecture that such continuous transmission without violation of the linearity requirement is possible. First, provided the acoustical signal is of high enough frequency—high enough that its acoustical wavelength is very small with respect to the dimensions of a nearby body—the associated acoustical wave may be scattered by that body such that shadow zones may exist, wherein very little acoustical energy propagates. This fact is demonstrated by both theory 3002 and measurements 3004. An example is provided in FIGS. 3A and 3B (referred to herein collectively as FIG. 3) (from Blake and Wilson, 1977), which shows the acoustical energy received at one end of a long, slender body of shape similar to a cavity from a source located on the long axis of the cavity, one body length beyond its opposite end. The geometry of the system is shown in FIG. 3A; acoustical energy received, according to an exemplary embodiment, including the results of acoustics theory 3002 and measurements 3004 are presented in FIG. 3B. From FIG. 3B it can be deduced that: (1) the acoustical energy transmitted to the antipode decreases as the transmitted frequency increases; (2) this transmission loss is very significant at high frequencies; and, (3) the trend of measured data is properly predicted by the theory of Blake and Wilson (although the absolute values are not).

Figure 4A:
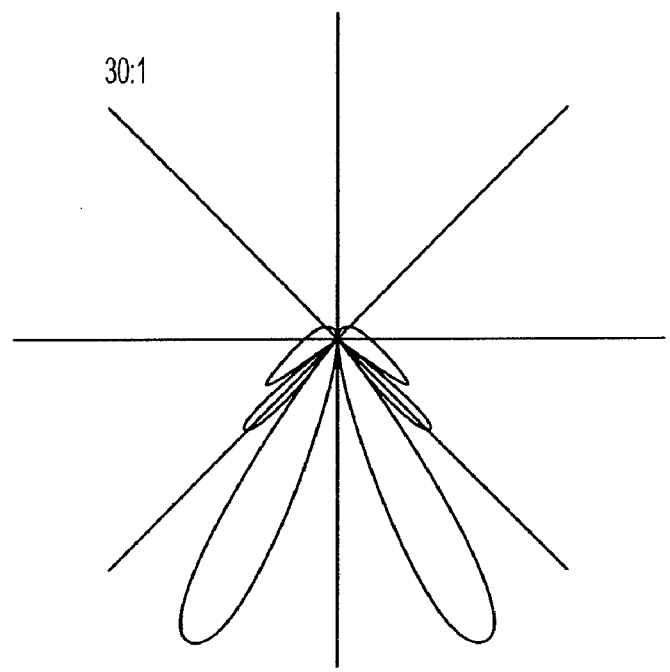
FIG. 4A depicts an exemplary graph depicting computational results showing a diffraction by slender spheroids of a plane wave incident along major axes including a diffraction pattern from a slender spheroid whose length-to-diameter ratio is 30:1 of an incident plane wave, the wavelength of which is approximately 6.4 times shorter than the length of the body major axis according to an exemplary embodiment of the present invention.
Figure 4B:
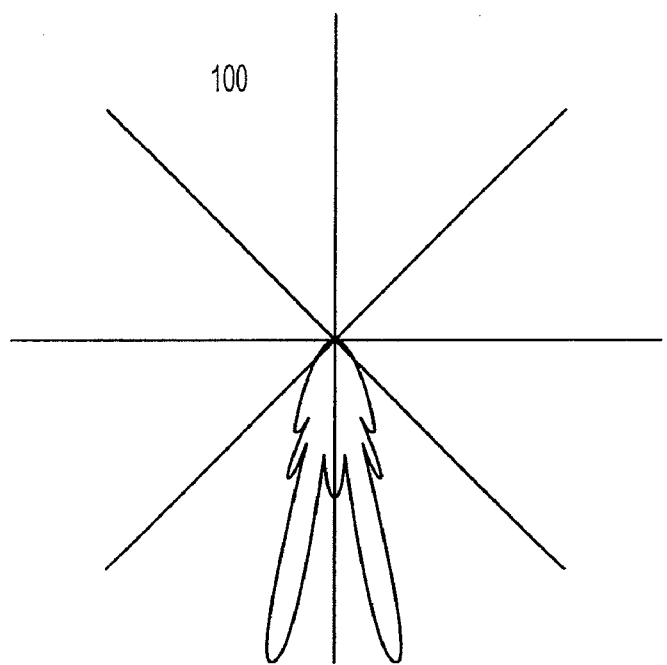
FIG. 4B depicts an exemplary graph depicting computational results showing a diffraction by slender spheroids of a plane wave incident along major axes including a diffraction pattern from a slender spheroid whose length-to-diameter ratio is 12:1 of an incident plane wave, the wavelength of which is approximately 31.8 times shorter than the length of the body major axis according to an exemplary embodiment of the present invention.

Further evidence of such behavior is presented in FIGS. 4A and 4B (referred to herein collectively as FIG. 4) (from Sammelmann, et al, 1988), which shows the diffraction pattern resulting from propagation of a plane wave in the direction of the long axis of long, slender prolate spheroidal bodies. In FIG. 4A, the length of the major axis of the diffracting body is 30 times greater than its minor diameter and the length of this major axis is approximately 6.4 times the wavelength of the incident wave. In FIG. 4B, the length of the major axis of the body is 12 times greater than its minor diameter and the length of this major axis is approximately 31.8 times the wavelength of the incident wave. In both cases, the shadow zone behind the body is apparent.

An additional advantage in meeting the linearity requirement results from the fact that waves propagating along an impedance boundary can, under certain conditions, decay faster than those propagating in the field (Wenzel, 1974). In the case of a waves originating at a transmitter located near the boundary of a cavity, which is a surface of constant or nearly constant pressure (that is, a soft surface), waves propagating along that surface will, under certain conditions, decay faster than those radiating into the field. Thus, even though the transmitter is located relatively close to a cavitator-mounted receiver, a transmission loss along the direct path from the transmitter to the receiver is anticipated to play an important role in ensuring that the linearity requirement is met.

If more than one transducer is used to transmit the acoustical signal, such as is the case in the exemplary embodiment, transmit null steering can be employed to further ensure that the linearity requirement is met. In one embodiment, transducers are employed in pairs, the signal from each element of which is directly out of phase with the other. If two pair of transducers are used in such a scheme, the amplitude of the total signal received at a point x in space is given by $$P(x) = \sqrt{\sum_{\cos}^{2} + \sum_{\sin}^{2}},$$

where $$\sum_{\cos} = \frac{\cos(kR_1 - \phi_1)}{R_1} - \frac{\cos(kR_2 - \phi_1)}{R_2} + \frac{\cos(kR_3 - \phi_3)}{R_3} - \frac{\cos(kR_4 - \phi_3)}{R_4}$$

and $$\sum_{\sin} = \frac{\sin(kR_1 - \phi_1)}{R_1} - \frac{\sin(kR_2 - \phi_1)}{R_2} + \frac{\sin(kR_3 - \phi_3)}{R_3} - \frac{\sin(kR_4 - \phi_3)}{R_4}.$$

Here the subscripts 1, 2, 3, and 4 refer to each of the 4 transducers employed in this embodiment. The wave number of the transmitted acoustical signal is k, and $\phi_i$ is the phase of the signal being transmitted from transducer i. The distance from each transducer i to point x is $R_i$. In each of the above two equations, the terms are grouped in pairs, with the first two terms representing that component of the transmitted signal produced by a pair of out-of-phase transducers, and the last two terms representing that produced by the other pair of out-of-phase transducers.

Figure 5A:
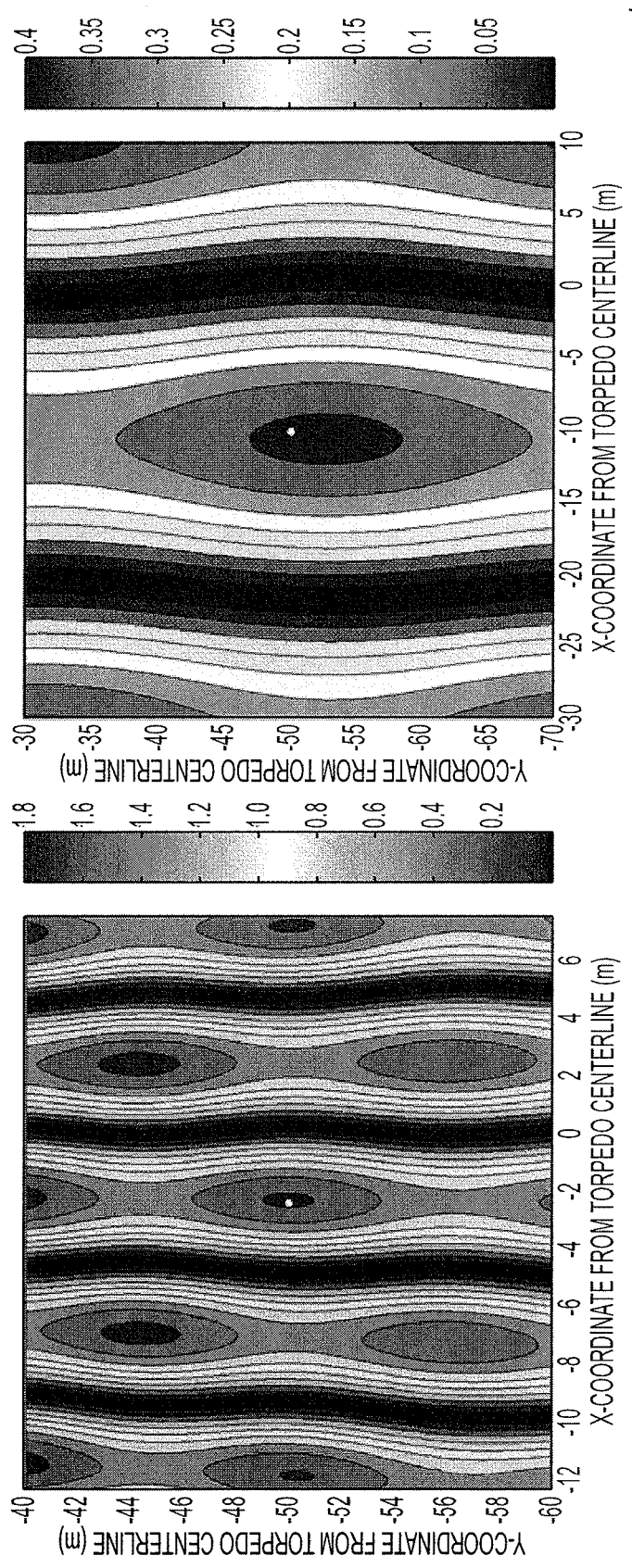
FIG. 5A depicts an exemplary graphical depiction of predicted interference patterns in the plane of the target due to four fin-mounted transducers in a cruciform arrangement: for a target at two relatively long-range locations, according to an exemplary embodiment of the present invention.
Figure 5B:
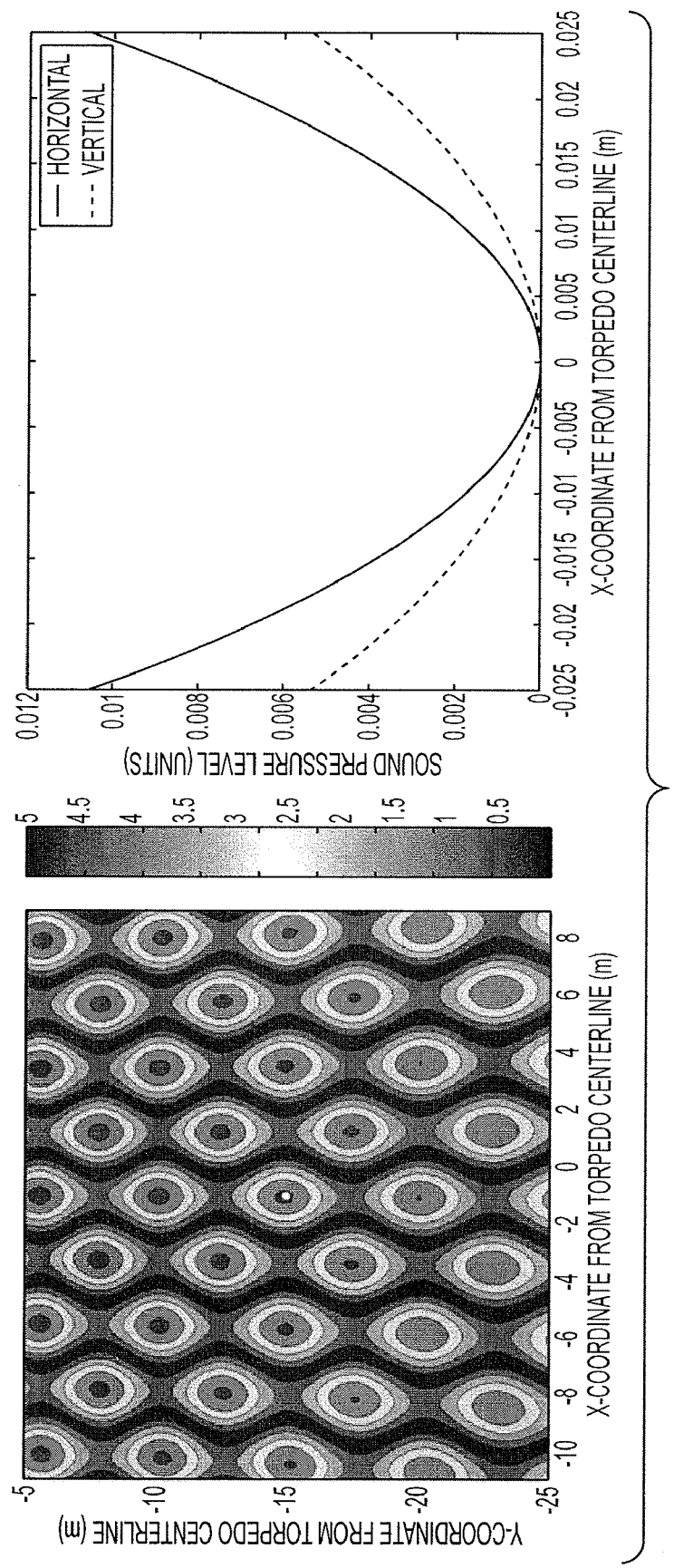
FIG. 5B depicts an exemplary graphical depiction of predicted interference patterns in the plane of the target due to four fin-mounted transducers in a cruciform arrangement: for a target at relatively short-range, also showing the received signal on the cavitator-mounted array, according to an exemplary embodiment of the present invention.

FIG. 5A shows representative signals of an exemplary embodiment received from such a system at the points in planes oriented normal to the long axis of the torpedo and located at several arbitrary distances ahead of the receiver, accounting for spherical spreading, but not accounting for diffraction or attenuation. In each of these cases, it has been assumed that the transmitters are located in a cruciform arrangement 3 m aft of the foremost receive element, with 2 elements located on the tips of the elevator control fins (those with nominally horizontal spans) and 2 elements located on the tips of the rudder control fins (those with nominally vertical spans). In FIG. 5A, the ratio of the amplitude of the signal emitted from the elevators is assumed to be 10 times greater than that emitted from the rudders. It can be seen that a target located 100 m ahead or, 2.5 m to port or, and 50 m below the receive array will be subject to a local maximum of acoustical energy. However, since the transducers are symmetrically located about the centerline of the receive array and are directly out of phase in pairs, each of the signals received at the center-point of the foremost element of the receive array (assumed to lie on the torpedo centerline, and thus on a plane bisecting the lines containing the two out-of-phase pairs) will cancel one another, so that the total acoustical energy received via the direct path will be effectively zero. Similarly, the acoustical energy impinging on targets located at other points in the field can be locally maximized by slightly redirecting the torpedo and simultaneously adjusting the ratio of the elevator-to-rudder source levels. An example with the target located 500 m ahead of the receive array is shown in FIG. 5A. A third example with the target located 50 m ahead of the receive array and an elevator-to-rudder source level ratio of 2 is shown in FIG. 5B, along with the variation of the total sound pressure level (SPL, discounting diffraction and attenuation) over two curves on the surface of the receiver, assumed for purposes of this example to be paraboloidal. It can be seen that, although the receive array is assumed to be of finite extent transverse to the torpedo centerline, and therefore the signals from out-of-phase pairs do not cancel exactly, the maximum total signal received along the direct path (discounting diffraction) is very small in comparison with that received at the target.

An exemplary advantage of the RWT sonar system as applied to cavitating bodies is the very significant processing gain that is expected over pulsed sonar systems. Based on estimated performance taught by Lerro, et al, (2003), recognition differential gains over a pulsed system may approach 6 dB under reverberation-limited conditions and greater than 20 dB under noise-limited conditions.

Another advantage of the RWT sonar system as applied to cavitating bodies is the very significant improvement in target track latency that is expected over pulsed sonar systems. Based on estimated performance taught by Lerro, et al, (2003), an order-of-magnitude improvement may be expected in comparison with conventional high-power pulsed search sonar. This advantage is expected to be especially significant for application of the RWT concept to high-speed undersea weapon systems, such as supercavitating torpedoes, for which the total time available to establish a target track is relatively very small, so that any significant latency will severely reduce overall system performance.

Yet another advantage of the RWT sonar system as applied to cavitating bodies in an exemplary embodiment of a vehicle-mounted transmitter, is that, at the frequencies of interest, a lower source level is required to ensonify a target by such a vehicle-mounted transmitter, than by one deployed at further distance from the target, such as on the platform launching the vehicle. In addition to requiring less power, the lower required source strength significantly reduces the opportunity for counter-detection for torpedo-type applications.

Figure 6A:
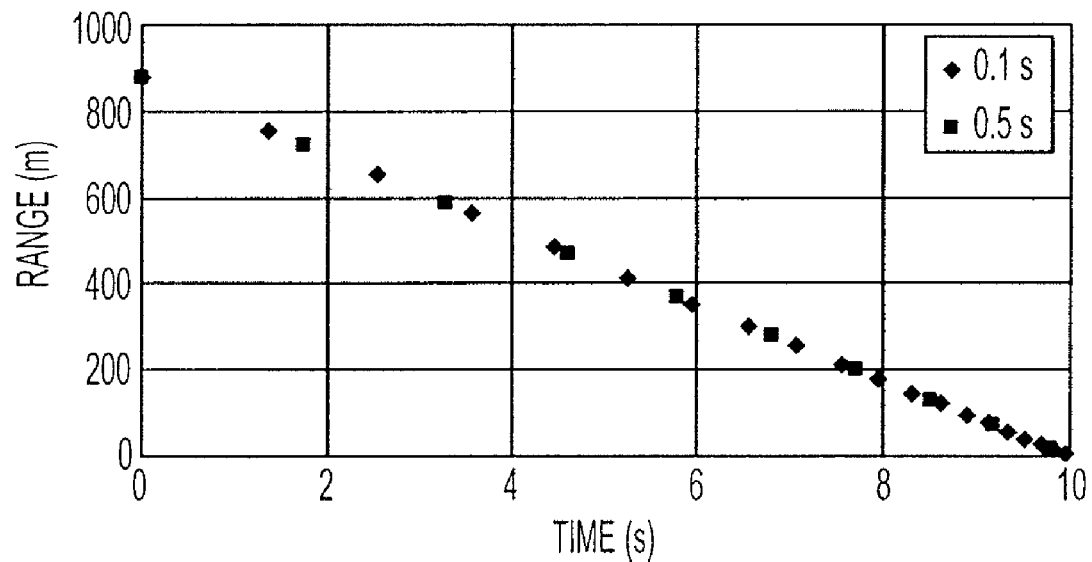
FIG. 6A depicts an exemplary guidance and control advantage of a RWT torpedo sonar as compared with a non-ambiguous ping-based system graphing range versus time for a series of pings transmitted by a torpedo closing on a target at 100 m/s from an initial range of 1000 m for two different ping cycle periods, according to an exemplary embodiment of the present invention.
Figure 6B:
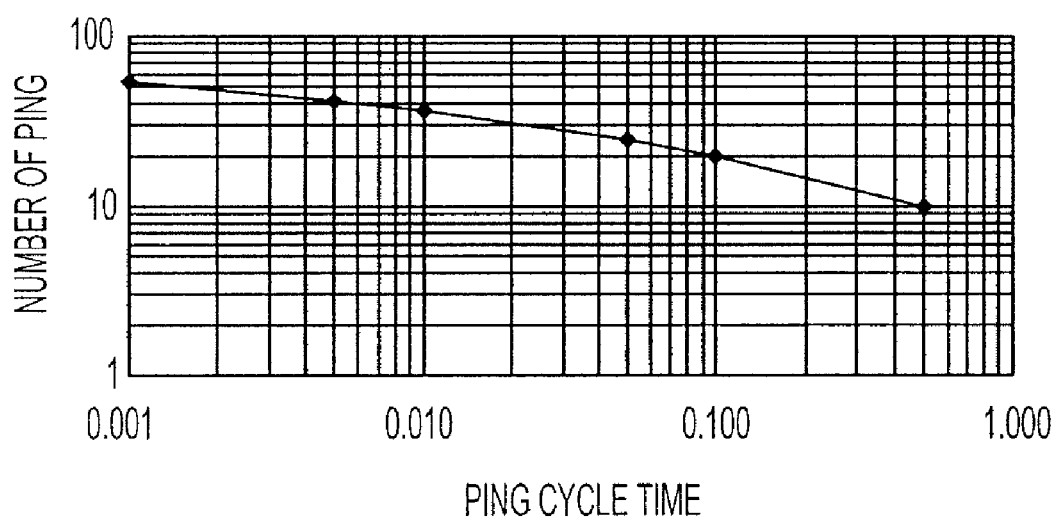
FIG. 6B depicts an exemplary guidance and control advantage of a RWT torpedo sonar as compared with a non-ambiguous ping-based system graphing maximum number of pings versus ping cycle period for the same closing maneuver, according to an exemplary embodiment of the present invention.

Further advantage involves an anticipated improvement in guidance and control capability over pulsed sonar systems, due to the effectively continuous data stream available for establishing a target track, as is illustrated with the aid of FIG. 6 (FIGS. 6A and 6B, collectively). FIG. 6A compares the range at each ping for a series of non-ambiguous pings transmitted from a notional vehicle traveling toward a target at a speed of 1000 m/s from an initial range of 1000 m for two different ping cycle periods. A non-ambiguous ping is one that is not transmitted until the previous ping in the sequence is received as an echo from the target, ensuring that the actual track of the target relative to the receive array is known uniquely. In practice, ping cycle periods cannot be infinitesimal, because of an unavoidable delay associated with receiving, processing, and retransmitting the signal. As the ping cycle period increases, the total number of pings that can be transmitted before the transmitting body reaches or passes the target decreases. As this total number of pings decreases, the number of data available to estimate the relative target track is also reduced, and the error in the estimated target track increases. The variation in the number of pings versus ping cycle period for the same case of a notional vehicle traveling toward a target at a speed of 100 m/s from an initial range of 1000 m is presented in FIG. 6B. It can be seen that this quantity is reduced to a value of only 10 for a ping cycle period of 0.5 s. Since a RWT sonar system is transmitting and receiving data continuously, the estimated target track is based on a continuous data stream, and target track error is expected to be significantly reduced. Ambiguity is eliminated via the selection of the transmitted wave form, using a scheme taught by Lerro, et al, (2003).

Other advantages of the proposed RWT sonar system involve its compatibility with other techniques for cavitating torpedo homing taught in conventional documents. (See, for example, Stinebring, D. R., T. A. Brungart, S. D. Young, C. W. Allen, and J. W. Lindau (2002) "Cavitator Design for Acoustic Homing," Record and Disclosure of Invention #2003-0759, The Pennsylvania State University, The Applied Research Laboratory, University Park, Pa., (hereinafter "Stinebring, et al., 2002")). Specifically, techniques for reducing the self noise of cavitator-mounted receive arrays, such as by selecting the cavitator shape to maintain laminar flow over its surface, can be fully effective in combination with the RWT technique.

Figure 7:
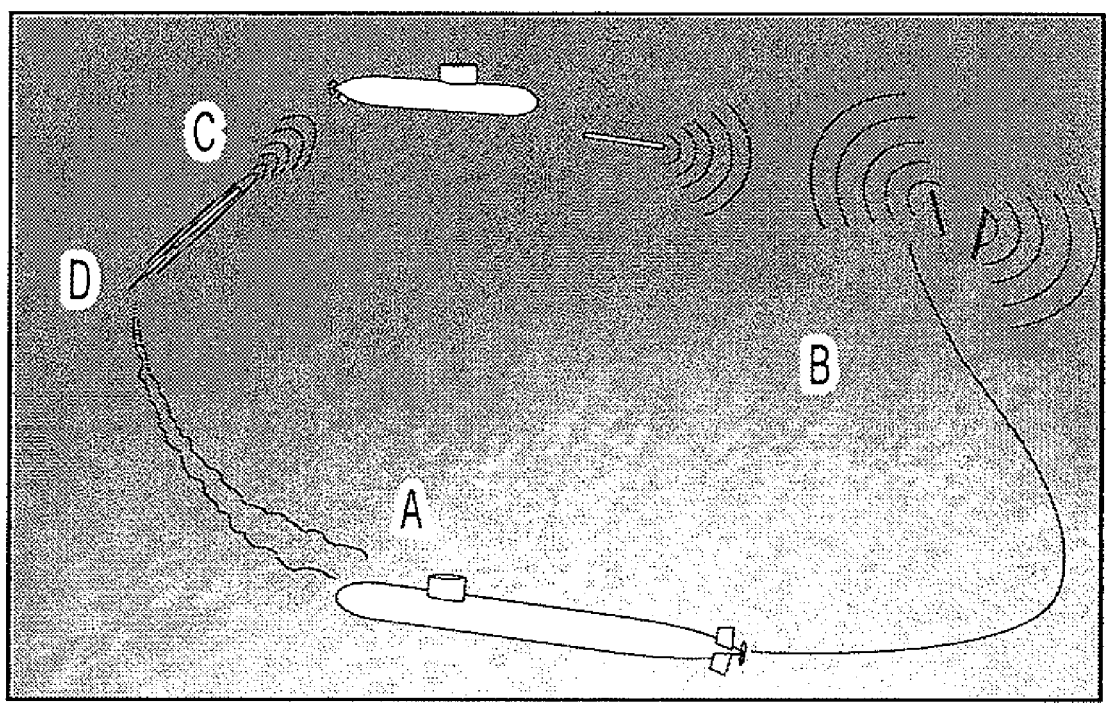
FIG. 7 depicts an exemplary depiction illustrating various exemplary candidate transmitter source locations considered in alternative exemplary embodiments of the invention.

In another exemplary embodiment of the invention, further advantages may be achieved including, in an exemplary embodiment, incorporating a transmitter system attached directly to the cavitating body. Another exemplary embodiment, may include a transmitter system located elsewhere in the water. For application to a supercavitating torpedo, such as, e.g., but not limited to, the increased aperture homing cavitator (IAHC) discussed above, according to an exemplary embodiment of the present invention, at least four options may exist, including the following options for locating the transmitter, as depicted in FIG. 7:

Case A—mounted on the platform such as a submarine from which the supercavitating torpedo is launched;

Case B—mounted on a device that is separate from the supercavitating torpedo, launched from the same launch platform;

Case C—mounted on the cavitator, and simultaneously serving as the receive array; and, Case D—mounted elsewhere on the supercavitating torpedo, such as on the tips of any control fins, or on a strut attached to the torpedo shell.

Exemplary advantages and disadvantages of each of these transmitter locations are summarized in Table 1. Although each of these options is claimed as alternative embodiments of this invention, a vehicle-mounted transmitter is assessed as the best option, and thus a preferred exemplary embodiment, since: it avoids the possibility that a launch platform-mounted transmitter would act as an acoustical beacon that may alert an enemy of the presence and location of the launch platform; it avoids the need for a separately launched device; and it takes advantage of the scattering and transmission loss properties of the cavity (as described above).

TABLE 1

(see FIG. 7) Exemplary Advantages and disadvantages the various transmitter source locations considered in alternative embodiments of the invention

| Location | Advantages | Disadvantages |
| --- | --- | --- |
| A | Excellent source-receiver separation<br>Reduces vehicle power requirements | Source acts as beacon for own-ship position<br>Would require development and operation of new transponder |
| B | Excellent source-receiver separation<br>Reduces vehicle power requirements | Requires development and operation of separately launched device |
| C | If feasible, no extra transponder would be required | No source-receiver separation<br>No cavity-associated transmission loss |
| D | Some source-receiver separation<br>Cavity provides source-to-receiver transmission loss | Source-receiver separation is small |

While various embodiments of the present invention have been described above, it should be understood that they have been presented by way of example only, and not limitation. Thus, the breadth and scope of the present invention should not be limited by any of the above-described exemplary embodiments, but should instead be defined only in accordance with the following claims and their equivalents.

What is claimed is:

1. A method comprising:
   applying a receiving-while-transmitting (RWT) sonar signal processing to at least one cavitating body, over an entire range of achievable sonar operating frequencies;
   applying transmit wave-form shaping to a RWT sonar system employed on said cavitating body;
   applying heterodyne filter frequency rejection to said RWT sonar system employed on said cavitating body;
   applying detection processing techniques to said RWT sonar system employed on said cavitating body;
   employing at least one transducer as an acoustical transmitter near a scattering body comprising said cavitating body, wherein said at least one transducer is strategically located with respect to said cavitating body, at least one target, and a receiver, wherein said receiver lies in a shadow zone of the body, but the at least one target does not; and,
   employing at least one transducer as an acoustical transmitter near a scattering body comprising said cavitating body, wherein said at least one transducer is strategically located with respect to a cavity, at least one target, and a receiver, wherein direct propagation of a transmitted signal along the outside of the cavity to said receiver is inhibited, and reflected propagation from said acoustical transmitter to the target and thence reflected to said receiver is not inhibited.

2. The method of claim 1, further comprising:
   applying a high-data-rate tracking technique to said RWT sonar system employed on said cavitating body.

3. The method of claim 1, further comprising:
   employing an output of said RWT sonar system (including said transmit wave-form shaping, said heterodyne filter frequency rejection, said detection processing, and said high-data-rate tracking) to support guidance and control of said cavitating body.

4. The method of claim 1, wherein said cavitating body comprises a supercavitating torpedo.

5. The method of claim 1, further comprising:
   applying transmit null steering techniques to improve performance of said RWT sonar system for said cavitating body.

6. The method of claim 5, wherein said transmit null steering technique comprises a phase cancellation technique.

7. The method of claim 1, further comprising:
   applying receive beam-former spatial rejection to improve performance of said RWT sonar system for said cavitating body.

8. The method of claim 1, further comprising:
   at least one fin-mounted transducer as said transmitter of said RWT sonar system for said cavitating body.

9. The method of claim 1, further comprising:
   employing at least one cavitator-mounted receive array, including a receive array incorporated in a laminar flow cavitator, in combination with said at least one transmitter, said receive array serving as said receiver of said RWT sonar system for said cavitating body.

10. The method of claim 1, further comprising:
    applying said RWT sonar system to said cavitating body wherein said at least one transmitter is coupled to said cavitating body at a location other than a tip of a fin.

11. The method of claim 1, further comprising:
    applying said RWT sonar system to said cavitating body wherein said at least one transmitter is detached from said cavitating body.

12. The method of claim 1, further comprising:
    applying said RWT sonar system to said cavitating body wherein said at least one transmitter is located on a platform from which said cavitating body is launched.

13. A method for detecting sonar signals comprising:
    generating a waveform;
    performing waveform shaping;
    transmitting said waveform acoustically from a cavitating body;
    directly receiving said acoustic waveform and reflected echoes of said acoustic waveform at said cavitating body;
    performing temporal frequency rejection on said received acoustic waveforms;
    optionally performing the step of spatially filtering said received acoustic waveform; and
    optionally tracking said detected reflected echoes.

14. The method according to claim 13, wherein said transmitting said waveform is accomplished by emitting a single frequency continuous wave.

15. The method according to claim 13, wherein said shaping is accomplished by performing amplitude tapering.

16. The method according to claim 13, wherein said waveform shaping is performed to avoid signal discontinuities.

17. The method according to claim 13, wherein said waveform shaping is performed to avoid signal discontinuities at its beginning and end.

18. The method according to claim 13, wherein said cavitating body comprises a supercavitating torpedo.

19. The method according to claim 13, wherein said shaping comprises at least one of:
    performing amplitude tapering,
    avoiding signal discontinuities, and/or
    avoiding signal discontinuities at its beginning and end.

20. The method according to claim 13, wherein said cavitating body comprises at least one of:
    an increased aperture homing cavitator,
    a torpedo,
    a supercavitating body,
    a supercavitating torpedo, and/or
    a plurality of cavitating bodies.

* * * * *